UNITED STATES PATENT OFFICE.

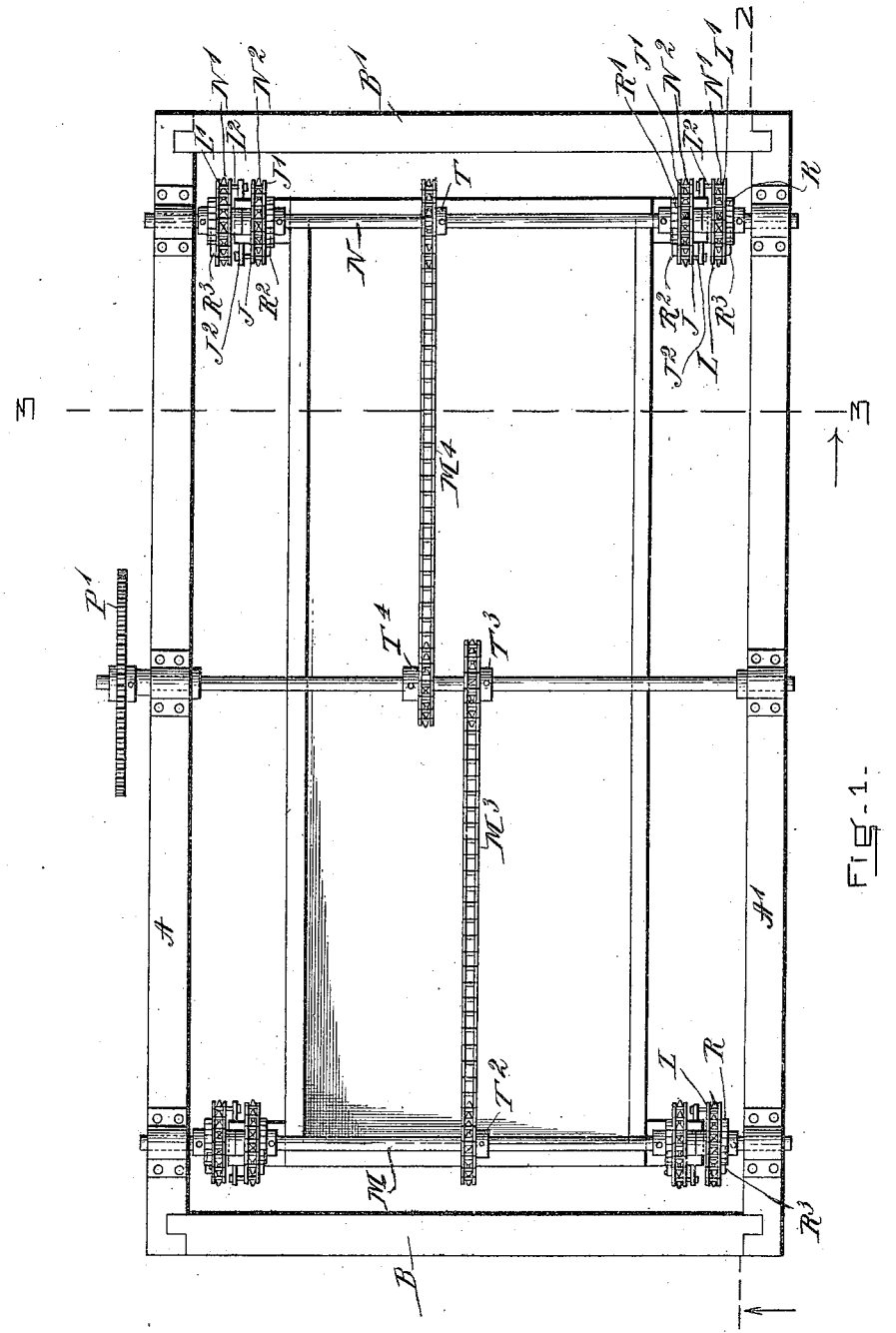

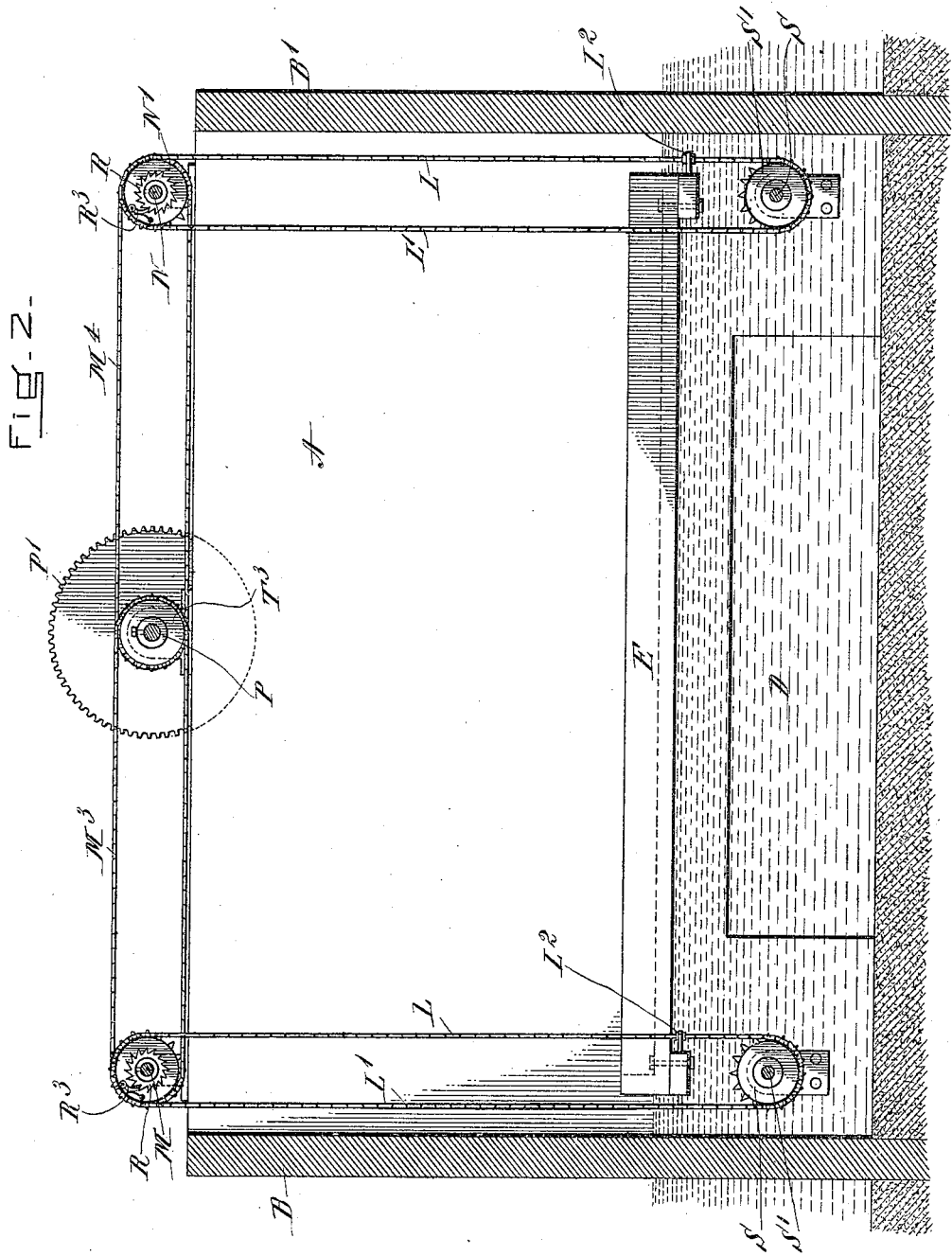

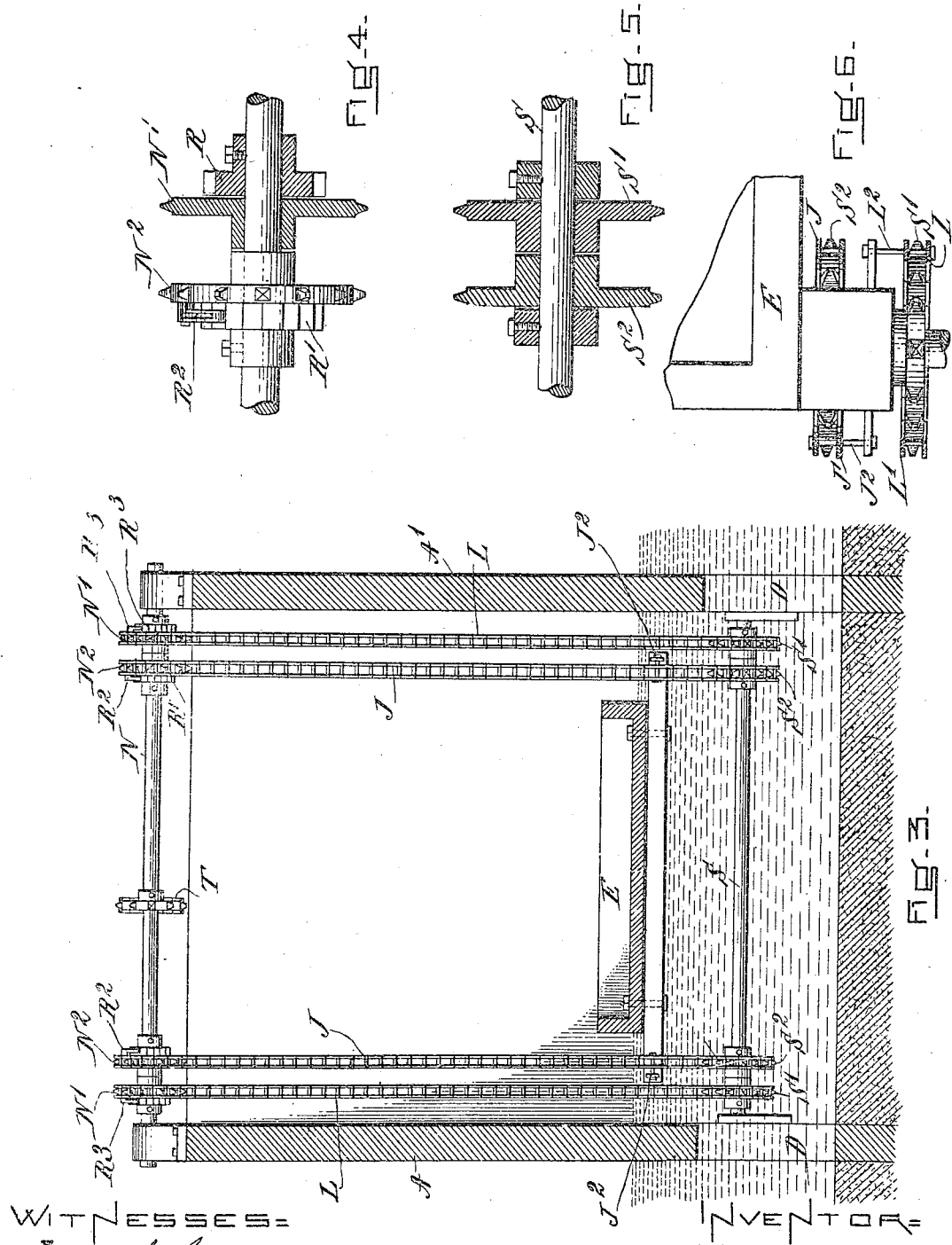

URIAH S. JACKSON, OF OSSIPEE, NEW HAMPSHIRE.

FLOAT TIDE-MILL.

961,410.  Specification of Letters Patent.  Patented June 14, 1910.

Application filed July 30, 1909. Serial No. 510,457.

*To all whom it may concern:*

Be it known that I, URIAH S. JACKSON, a citizen of the United States, a resident of Ossipee, in the county of Carroll and State of New Hampshire, have invented a new and useful Improvement in a Float Tide-Mill, of which the following, taken in connection with the accompanying drawings, is a specification.

My invention relates to a float tide mill and consists in the peculiar arrangement and construction of the coöperating parts, the object being to make an apparatus that will convert the energy due to the ebb and flow of the tide into continuous motion for operating machinery.

The exact working and construction of the device may be best understood by reference to the full specification.

The drawings which accompany and form a part of this specification are as follows:—

Figure 1 is a plan of my apparatus. Fig. 2 is a vertical section taken on line 2—2 of Fig. 1. Fig. 3 is a vertical section taken on line 3—3 of Fig. 1. Fig. 4 is a detail of sprocket wheels and ratchet devices on the upper shafts. Fig. 5 is a detail of sprocket wheels on the lower shafts. Fig. 6 is a detail showing in plan a corner of the float also showing one set of sprocket wheels and chain belts.

In the drawings A, $A^1$, B, $B^1$, indicate a frame or casing constructed for the purpose of supporting the mechanism that is used for transmitting the motion of the float, E, to the shaft P and gear wheel $P^1$ from which, as mechanical energy, it may be transmitted, for any useful purpose. The rising and falling tide water has free access to the float E, through the openings D, D.

The two shafts S, S, are located at or near the lower part of the casing and below the low-water mark. The float E is attached to each set of chain belts which are arranged, as shown, that is, there is one set, of two, at each corner of the float E. In case the float is large more sets of chain belts may be required. The sprocket wheels $S^1$ $S^2$ are attached loosely on their shafts so that as the float E moves up or down the chains and sprocket wheels will necessarily move with it, but the shafts, S S, may remain stationary.

The arrangement by which I cause the main shaft P to always move in the same direction whether the float E moves up or down may be explained as follows: Referring to the drawing, especially Figs. 3 and 5, the sprocket wheels $S^1$ and $S^2$ run loosely on the shaft S and are made to rotate by the action of their respective chains L $L^1$ and J $J^1$ (see Fig. 6). For convenience in description I will term the two parts L $L^1$ as members; *i. e.* members L and $L^1$ form one chain and the two parts J and $J^1$ are members of the other chain, that is, the chain L $L^1$ operates the sprocket wheel $S^1$ and the chain J $J^1$ operates the sprocket wheel $S^2$. Bearing in mind that the member L of the chain L $L^1$ is attached to the float by bolt $L^2$ it follows that as the float goes up the wheel $S^1$ (Fig. 5) will rotate with the same, and that as the member $J^1$ of the chain J $J^1$ is attached to the float by the bolt $J^2$ it follows that as the float goes down the wheel $S^2$ will also rotate with the same. Thus we see that whether the float goes up or down one of the two wheels in each of the sets will rotate in the same direction, and this is true of all the sets of sprocket wheels that are connected to the float.

It is obvious that if one or all of the sets of wheels on the lower shafts S and S turn in the same direction whether the float is going up or down, then one of each of the sets of sprocket wheels on the upper shafts N and M must turn in the same direction whether the float is going up or down; and that the wheels in each set alternate as to the direction in which they rotate.

In Fig. 5 I have shown in section one set of the lower sprocket wheels $S^1$ $S^2$ loosely mounted upon the shaft S. In Fig. 4 one set of the upper sprocket wheels $N^1$ and $N^2$ is mounted loosely upon the shaft N; one, $N^1$, of these is shown in section which also shows in section a ratchet wheel (R) made fast to the shaft. The other sprocket wheel $N^2$ is shown in elevation and is loose on the shaft N, and its accompanying ratchet $R^1$ is made fast to the shaft N. The sprocket wheels $N^1$ and $N^2$ have pawls, one of which is shown at $R^2$ (Fig. 4). Both pawls $R^2$ and $R^3$ are shown in Figs. 1 and 3. These ratchets and pawls are so arranged that they cause the shafts N and M, to which the ratchets are made fast, to rotate in one direction only; that is, when the sprocket wheel is going in the wrong direction the pawl will not engage with the teeth of the ratchet but when the sprocket wheel is going in the right direction then its pawl will engage with the teeth of the ratchet and cause it and the shaft N to turn in the right direction. The rotation of the shafts N, M is communicated to the main power shaft P and the wheel P¹ by chain belts M⁴ M³ from the sprockets T¹ T² to the sprockets T³ T⁴.

If but one casing and its apparatus is used there will be times at high water and at low water when there would be no action. To obviate this defect I have more than one complete casing and its apparatus arranged in series so that one or more of the series may be provided with controlling gates that are operated by the mechanism of some one of them in such a manner that no matter how the tide stands there will be one casing that has water stored ready for use at low water; for action at high water one casing may be maintained empty for water at high tide to flow into; thus the apparatus may work continuously and automatically. The ratchets their pawls and vertical chains connected to the shaft M are of the same kind as those of the shaft N.

Claim.

A tide float mill comprising a framework; a float constructed to rest upon the surface of tide water and to rise and fall with it; shafts attached to said framework below low-water mark, corresponding shafts attached to said framework above high-water mark; sets of sprocket wheels attached to said shafts; chain belts operating with said sets of sprocket wheels, one member of each of the said chain belts attached to said float; right- and left-hand ratchet wheels and pawls in working connection with said sets of shafts and their sprocket wheels, whereby the motion of said float in either direction will cause the said shafts above high water and their transmission devices to move in one direction only; substantially as and for the purpose set forth.

In testimony whereof, I have signed my name to this specification in the presence of two subscribing witnesses, on this 28th day of July A. D. 1909.

URIAH S. JACKSON.

Witnesses:
FRANK G. PARKER,
JOHN BUCKLER.